United States Patent Office 3,779,999
Patented Dec. 18, 1973

---

3,779,999
PROCESS FOR THE PREPARATION OF BRANCHED CONJUGATED DIENE COPOLYMERS
John L. Snyder, Long Beach, Mary J. Papavasiliou, Gardena, and Roger H. Mann, Corona del Mar, Calif., assignors to Shell Oil Company, Houston, Tex.
No Drawing. Continuation-in-part of abandoned application Ser. No. 102,194, Dec. 28, 1970, which is a continuation-in-part of application Ser. No. 759,518, Sept. 12, 1968, now Patent No. 3,551,392. This application Dec. 27, 1971, Ser. No. 211,941
Int. Cl. C08d 5/02, 5/04
U.S. Cl. 260—78.4 D
3 Claims

ABSTRACT OF THE DISCLOSURE

Conjugated diene polymers having a branched molecular configuration are prepared by first polymerizing a conjugated diene with an alkyl lithium initiator and thereafter coupling the first polymer with a diester of dicarboxylic acids with monohydric alcohol to form a low molecular weight polymer having satisfactory coagulation characteristics, driability, and processability.

---

This application is a continuation-in-part of our copending application Ser. No. 102,194 filed Dec. 28, 1970 now abandoned which is a continuation-in-part of our application Ser. No. 759,518 filed Sept. 12, 1968, now U.S. 3,551,392.

BACKGROUND OF THE INVENTION

Synthetic rubbers made from conjugated dienes have been studied extensively with respect to the polymerization initiators or catalysts, the structures of the polymers so obained and their properties relative to natural rubbers. While it is possible to vary the structure of synthetic rubbers by the use of particular techniques, it is often difficult to obtain a tailor-made polymer having a desirable combination of characteristics from a manufacturing and processing standpoint. It is necessary for the production of low-cost polymers that they be amenable to recovery from their polymerization medium, be readily driable and exhibit good processing characteristics.

Processing characteristics during mixing in a "Banbury" or other internal type mixer include:

(1) Coherency of Banbury discharge;
(2) Power required to mix; and
(3) Temperature of batch at discharge after a standard mixing cycle.

(1) *Coherency of batch.*—Discharge should be rapid and in a sequence of good sized, smooth, glossy lumps called "whales" because of their shape. With natural rubber the ideal lumps are all loosely or lightly connected in a string on discharge. The discharge should be rapid and entire, with no difficulty in removing the batch from the Banbury. An undesirable batch with respect to processability is a fine granular discharge accompanied by undispersed black. The transition from one end of the quality scale to the other occurs in subtle stages. If mixed in a test recipe, linear polypolyisoprene discharges as a mass of fine granules together with free black.

(2) *Band formation of sheet-off mill.*—The Banbury discharge is put on a mill, and the ease with which a smooth, coherent, non-lacey, non-rugose (lumpy) sheet is formed is estimated. Only a few (2-4) revolutions of the mill roll are permitted at this stage. After this evaluation the batch is further milled and evaluated for its mill handling characteristics: how it cuts and ¾ folds and how sticky, soft, or strong it is.

After milling, the stock is remixed in Banbury at about 75° F. to incorporate the curatives, then it is rested overnight and remilled.

The final stock is extruded through a Garvey die according to ASTM-D2230 and rated from 1 (poor) to 16 (excellent). Finally, the compound Mooney viscosity is measured.

(3) *Blends.*—Furthermore, and of substantial importance, the diene copolymer should be capable of being mixed with other elastomers, particularly natural rubber, to form homogeneous blends in a reasonable length of time.

One of the well-known types of polymerization initiators for conjugated dienes is an alkyl lithium. Normally, the alkyl lithium is employed to initiate polymerization of a conjugated diene in a hydrocarbon medium, resulting in the formation of long chains which are essentially unbranched; so much so, in fact, that they are referred to as "linear" polymers. It has been found that it is necessary to prepare relatively high molecular weight linear polymers of this type if they are to be readily separated from the polymerization solvent as discrete particles of rubber, (often referred to as "crumb") by the coagulation with steam or hot water.

Furthermore, it has been found in the past that relatively high molecular weight linear polymers are required if the coagulation crumb is to be dried under elevated temperature conditions such as on a moving belt through a forced air heating area. If a high molecular weight product of linear structure is not utilized, then during coagulation in hot water and steam, the crumb generally agglomerates to a mass which cannot be recovered to an economically useful product. Moreover, even if a suitable crumb structure is formed upon coagulation, it has been determined that unless the intrinsic viscosity of the linear polymer is in the order of 6 or higher, the crumbs have poor driability, since the normally porous crumbs tend to fuse at the surface upon heating, sealing water within this structure.

Finally, the high molecular weight linear polymers which pass these first two criteria are then found to be difficult to process at least until such time as they have been subjected to a sufficient amount of shear so that their intrinsic viscosity is drastically reduced. Moreover, it has been noted that the relatively high molecular weight linear polymers blend with reluctance with other rubbers such as natural rubber and in the course of such blending operations crumbling often occurs and vulcanization recipe components are often poorly dispersed. Loss of ingredients represents an extreme case. It is important that highly reinforcing carbon blacks (ISAF or HAF) be more than just incorporated. They should be well dispersed. This is observed visually as "smooth, glossy lumps." The Banbury dumps of linear elastomers are found to be crumbly in nature and of an unsatisfactory consistency for good mixing.

Recently, several attemps have been made to alleviate this situation by changing the basic structure of the lithium alkyl initiated polymers such as by the use of so-called branching agents, of which divinyl benzene is regarded as typical; and of certain coupling agents which up to this time have been thought to include only those coupling agents having at least three sites capable of reaction with lithium to carbon bonds.

OBJECT OF THE INVENTION

It is an object of the present invention to provide a process for the preparation of conjugated diene polymers having improved manufacturing characteristics. It is a particular object of the invention to provide a process for the production of a branched conjugated diene polymer showing improved coagulation characteristics. It is a further object of the invention to provide a process for the production of a branched conjugated diene polymer having satisfactory driability. Finally, it is an object of the invention to provide a process for the production of certain branched conjugated diene polymers showing improved processing characteristics. Other objects will become apparent during the following detailed description of the invention.

STATEMENT OF THE INVENTION

A process for preparing homopolymers of $C_4$–$C_5$ conjugated dienes is disclosed and claimed in our U.S. Pat. 3,551,392. The instant application relates to homopolymers and copolymers of said conjugated dienes and to a process for preparing the copolymers.

Now, in accordance with the present invention, a process is provided for the preparation of a branched conjugated diene copolymer which comprises copolymerizing conjugated dienes having 4–5 carbon atoms per molecule in the presence of an alkyl lithium initiator to form a first polydienyl lithium "living" polymer and reacting the "living" polymer with at least 0.5 equivalent per equivalent of lithium of a monohydric alcohol ester of a dicarboxylic acid, whereby a branched polymer having an intrinsic viscosity between about 2.0 and 3.75 is formed. It has been found that the products of this process exhibit in a single individual product the three criteria referred to in the preceding paragraph, namely, good coagulation characteristics, good driability and good processing characteristics. The process is particularly useful to prepare branched polyisoprene-polybutadiene copolymers wherein the ratio of isoprene to butadiene may vary from about 5:95 to about 95:5, preferably from about 10:90 to 90:10. The process especially contemplates the use as the coupling compound of a diester of a fatty alcohol and an aliphatic dicarboxylic acid. Preferably the branched product has an intrinsic viscosity of 2.2–3.6 (preferably 2.6–3.0) dl/g., solvent: toluene, temperature: 30° C.

The star-shaped polymers of this invention discharge from a standard Banbury test as coherent, smooth, glossy lumps. They exhibit good band formation on a sheet-off mill, give excellent Garvey rating extrusions at a high extrusion speed, and show acceptable compound Mooney viscosities, which are indirect proportion to their raw Mooney's.

The products formed by the use of the diester coupling agents of this generically claimed class have been found to be primarily mixtures of trimer and tetramer of the initial polymer; the extent of each has not yet been determined. While it is not intended to limit the present invention, it is postulated that the following equation represents the majority of the coupling reaction which occurs:

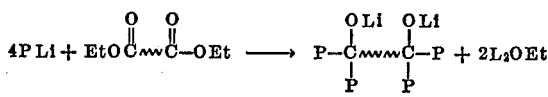

In the above equation the term "Et" is meant to represent an ethyl radical while the letter "P" represents the initially formed conjugated diene polymer terminated with a lithium ion. It will be noted from the above equation that the use of the subject class of diesters permits the formation of coupled products having the form of tetramers of the first polymer. This is in direct contrast with the results which would be obtained if an ester of a monocarboxylic acid and a polyhydric alcohol were utilized in place of the class forming the important aspect of this invention.

It is stressed that the diesters which are operable in the present process must be those in which the carboxyl radicals of the acid from which the ester is made are directly attached to a carbon atom; preferably the two carboxyls are connected by carbon-to-carbon bonds only and no carbon-to-oxygen bonds are present in these connecting links. However, the acids may contain heteroatoms such as oxygen, nitrogen or sulfur, replacing the carbon atoms in the chain. The following lists of aliphatic acids illustrates the dicarboxylic acids which may be used for the formation of suitable esters.

Aliphatic acids

| | |
|---|---|
| Oxalic | Maleic |
| Malonic | Fumaric |
| Succinic | Glutaric |
| Adipic | Pimelic |
| Suberic | Sebacic |
| Itaconic | |

The following list of aromatic acids illustrate the type of dicarboxylic acids which may be employed for forming suitable esters:

Aromatic acids

| | |
|---|---|
| Phthalic | Isophthalic |
| Terephthalic | Naphthalic |
| Diphenic | |

Esters of the above types of dicarboxylic acids may be formed from either aliphatic or aromatic monohydric alcohols of which the following are typical:

Monohydric alcohols

| | |
|---|---|
| Methyl | Ethyl |
| n-Propyl | Isopropyl |
| n-Butyl | Sec.-butyl |
| Tert.-butyl | Amyl |
| Hexyl | Octyl |
| Phenol | Cresol |

The esters may bear alkyl or aryl substituents without altering the nature of the present invention. The following esters are typical of those prepared from the above types of acids and esters:

Esters

| | |
|---|---|
| Dimethyl oxalate | Diethyl oxalate |
| Dipropyl malonate | Dibutyl glutarate |
| Dihexyl pimelate | Dimethyl adipate |
| Diethyl adipate | Dioctyl sebacate |
| Dimethyl phthalate | Diethyl terephthalate |

One of the important aspects of the present invention is the discovery of the intrinsic viscosity range which will result in polymers of good processability and which at the same time will also exhibit good coagulation characteristics and good drying properties. The branched configuration of the subject polymers is required for this combination of properties in a single product. Furthermore, the relatively low intrinsic viscosity recited hereinabove is required for good processability but because of the branched configuration this also permits good driability and coagulation characteristics. Branched polymers obtained by the process of the invention, with the exception that the intrinsic viscosity is permitted to be substantially higher than that recited, results in polymers having the same difficulties of processability experienced with linear polymers of relatively high intrinsic viscosity. Linear polymers which are essentially unbranched and which are of relatively low intrinsic viscosity within the range cited, i.e., 2.0–3.75, have apparently good processability but are not capable of being coagulated by hot water or steam and have extremely poor drying and storage characteristics. Star-shaped diene copolymer having an intrinsic viscosity (IV) of 1.8 dl./g. does not dry well. A 2.2 dl./g. IV polymer dries but is somewhat sticky when hot and shows some cold flow on storage. The optimum IV is about 2.6–3.0 dl./g. When the IV gets much above 3.6 dl./g. the processability begins to worsen, Banbury dumps begin to crumble, extrusion rate, and Garvey rating decrease, and the compounded Mooney goes above the desirable range. Consequently, the process of the present invention is directed to the preparation of copolymers of conjugated dienes having the restricted intrinsic viscosity range so as to result in the critical combination of three characteristics recited hereinbefore.

The intrinsic viscosity of the first "living" copolymer is readily controlled by the proportion of lithium alkyl initiator employed in its formation. Normally for the production of this "living" copolymer between about 0.3 and about 0.8 milliequivalent per 100 grams of monomer are employed. Preferred are lower alkyl lithium initiators such as ethyl lithium, N-butyl lithium, sec-butyl lithium, cyclohexyl lithium and the like. The polymerization is normally carried out in an inert hydrocarbon medium such as in cyclohexane or isopentane or mixtures thereof. Other relatively volatile hydrocarbons may be employed in addition to or in place of these species, the criterion being that the hydrocarbon medium is one capable of being flashed off in contact with hot water and/or steam. The process generally comprises admixture of an alkyl lithium with conjugated diene monomers in the presence of the inert hydrocarbon medium and polymerization at temperatures between about 20° C. and about 100° C. to result in a first lithium-terminated polymer which usually will have an intrinsic viscosity in the order of 1.0–2.5 and preferably within the range from about 1.2–2.0.

The copolymers may be prepared according to the process of the invention by combining in the ratio desired, the total amount of diene monomers in an inert hydrocarbon. Initiation of the mixture will generally result in a so-called "tapered" copolymer wherein the "living" polymer formed contains a significantly higher ratio of butadiene units than that of the feed. As the butadiene monomer is depleted, a progressively increasing number of isoprene molecules are incorporated into the "living" polymer. Upon depletion of the butadiene monomer, any remaining monomeric isoprene is polymerized to form a block of polyisoprene at the end of the polymer chain. The still active chain is then reacted with a diester to form a branched copolymer.

A random copolymer of substantially constant composition can be prepared by controlled addition of butadiene to a solution of butadiene and isoprene in hydrocarbon solvent after initiation. The rate of addition may be programmed to maintain the polymerization mixture at the starting composition resulting in a "living" copolymer of substantially constant composition throughout the length of the polymer chain. It is also possible to prepare a random copolymer by the addition of a small amount e.g. 0.01–10%, based on the total polymerization mixture, of a microstructure regulator such as an ether, thioether, a tertiary amine and the like, however, the use of such a polar material influences the microstructure of the copolymer in a way which may be undesirable for some applications.

Still another method for preparing the copolymer is to polymerize the butadiene and isoprene by sequential addition of the monomers resulting in two or more alternating homopolymer blocks of polybutadiene and polyisoprene in the "living" copolymer which may then be coupled according to the invention to join a star-shaped copolymer.

Following polymerization of this first "living" copolymer, the diester is then added to the reaction mixture to cause the production of the coupled branched polymers desired as the end product of this invention. The esters are usually added in an amount from about 0.5 to about 1.5 equivalents per equivalent of lithium ions. Greater amounts may be used without adverse effect on the final branched copolymer, however, use of large excess of the diester may be uneconomic. Reaction with the coupling agent is usually rapid but the rate will depend in part upon the temperature, which is preferably between 20 and 80° C., normally between 25–75° C. The reaction mixture usually is held only for short periods for coupling, usually about 0.1–4 hours. The coupling process may be carried out in a batch manner or continuously.

Following the coupling reaction, any residual carbanions are terminated by a protonating agent such as by the addition of water, alcohol or other similar reagent. The product may be recovered by coagulation utilizing hot water or steam or both to recover the polymer in a crumb-like product which is then subjected to drying and thereafter is utilized for various end uses including e.g. modification of thermoplastics such as polystyrene, and polypropylene, and in compounded tire tread and tire carcass stocks and the like. Usually in the latter applications it will be used in conjunction with another rubber such as natural rubber or SBR and it has been found that when the intrinsic viscosity of the branched product is within the range described the compounding and blending thereof with other rubbers is highly satisfactory.

The following examples illustrate the process of the present invention.

Example I

A series of polyisoprene was formed involving polymerization of isoprene utilizing secondary butyl lithium as the initiator. The polymerizations were carried out by mixing isoprene in isopentane as a reaction solvent and polymerizing at the temperatures and times indicated in Table I which follows. The series of polymers prepared were varied in their first polymer, i.e., "precoupled" intrinsic viscosity so that when coupled with the selected diester (diethyl adipate) the resulting series of polymers would have the spread in final intrinsic viscosites indicated also in Table I. It will be noted according to Table I that polymerization temperatures varied from 40–60° C. with reaction times varying from about 2½ hours to 5 hours and that the time allowed for coupling after addition of diethyl adipate was about 10 minutes. The cis 1,4-content of the coupled products is relatively high, in the order of 70–80% as determined by nuclear magnetic resonance, and the products had satisfactory drying rates.

TABLE I.—POLYISOPRENE POLYMERIZATION AND RECOVERY DATA

| Sample | Initiator conc., p.p.m. | Solids, weight percent | Temp., °C. | Diethyl adipate/Li, ratio | Coupling reaction time, minutes | Total reaction time, minutes | Dietert drying rate, $R_o$. lb./(hr.-ft.$^2$) at 180° F. | Precoupled I.V., dl./g. | Final I.V |
|---|---|---|---|---|---|---|---|---|---|
| A | 62.3 | 15 | 40 | 1/4 | 10 | 312 | 2.0 | 1.2 | 2.2 |
| B | 23.3 | 12 | 50 | 1/4 | 20 | 189 | 1.7 | 2.0 | 3.6 |
| C | 9.8 | 10 | 50 | 1/4 | 10 | 245 | 3.5 | 3.8 | 6.7 |
| D | 4.8 | 8 | 60 | 1/4 | 10 | 156 | 2.4 | 4.5 | 7.3 |

Tables II and III show the processing characteristics and product properties of this series of samples. The compound used in testing the properties shown in Table II was as follows:

RECIPE A

Premium quality tread stock

Polymer _____ 100
Zinc oxide _____ 3
Stearic acid _____ 3
Phenyl-betanaphthylamine _____ 1
HAF black _____ 50
Aromatic extending oil _____ 5
Sulfur _____ 2
N-cyclohexyl-2-benzothiazolesulfenamide _ 0.6

It will be noted according to Table II that only the two Samples A and B having final coupled intrinsic viscosities of 2.2 and 3.6, respectively, showed rapid black incorporation times, good or fair Banbury dump quality, and excellent Garvey rating as well as high extrusion rates compared with the Samples C and D which are also branched polymers but have substantially higher intrinsic viscosities. The latter two samples not only crumbled in the Banbury dump and, therefore, were unsatisfactory, but also had far longer black incorporation times and much poorer Garvey ratings as well as lower extrusion rates.

TABLE II.—PROCESSING CHARACTERISTICS

| Sample | Pre-coupled I.V., dl./g. | Coupled I.V., dl./g. | Block incorp. time, min. | Banbury dump | | | Compound Mooney ML-4 | Garvey | | Extrusion rate, g./min. |
| | | | | Quality | Temp., °F. | Power, kw. | | Index | Percent swell | |
|---|---|---|---|---|---|---|---|---|---|---|
| A | 1.2 | 2.2 | 4.5 | Good | 255 | 3.7 | 59 | 16 | 24 | 111 |
| B | 2.0 | 3.6 | 4.5 | Fair | 285 | 4.8 | 86 | 12.5 | 60 | 114 |
| C | 3.8 | 6.7 | 31 | Crumbled | 255 | 3.7 | 80 | 8 | 80 | 80 |
| D | 4.5 | 7.3 | 43 | do | 245 | 3.6 | 72 | 7 | 34 | 84 |

TABLE III.—PRODUCT PROPERTIES OF TREAD STOCK

| Sample | Uncured (green) properties | | | Cured properties | | | |
| | Yield tensile, p.s.i. | Ultimate tensile, p.s.i. | Elongation to break, percent | Tensile, p.s.i. | Modulus, 300%, p.s.i. | Modulus, 500%, p.s.i. | Elongation at break, percent |
|---|---|---|---|---|---|---|---|
| A | 24 | 12 | 200 | 2,700 | 1,130 | 2,210 | 600 |
| B | 40 | 30 | 180 | 3,000 | 1,140 | 2,400 | 600 |

Example II

A star shaped tapered copolymer was prepared by copolymerizing an equal weight mixture of butadiene and isoprene in cyclohexane solvent with 55 p.p.m. of sec-butyl lithium initiator at 65° C. In this non-polar solvent the butadiene initially polymerizes much more rapidly than the isoprene resulting in a polymer block consisting predominantly of polybutadiene. As the reaction progresses and the concentration of butadiene monomer declines, the isoprene copolymerization becomes more significant. In the final stage of monomer conversion the butadiene monomer is depleted resulting in a block of polyisoprene at the end of the polymer chain. The active copolymer was then coupled with dimethyl adipate in the ratio of 0.25 mole of dimethyl adipate per mole of active polymeric carbanions resulting in a star shaped copolymer having an intrinsic viscosity of 3.2 dl./g.

We claim as our invention:

1. A process for the preparation of isoprenebutadiene copolymers having good processability comprising
(a) copolymerizing monomers selected from the group consisting of (1) isoprene and (2) butadiene in a weight ratio of (1) to (2) from about 5:95 to about 95:5 in the presence of an alkyl lithium initiator to form a "living" polydienyl lithium copolymer, and
(b) reacting said copolymer with at least 0.5 equivalents per equivalent of lithium, of a monohydric ester of a dicarboxylic acid as a coupling compound whereby a branched copolymer having an intrinsic viscosity between about 2.0 and 3.75 is formed.

2. A process according to claim 1 wherein the coupling compound is a diester of a fatty alcohol and an aliphatic dicarboxylic acid.

3. A process as in claim 1 wherein step (a) is carried out in the presence of 0.01–10% of a polar material selected from the group consisting of an ether, thioether or tertiary amine.

References Cited
UNITED STATES PATENTS
3,594,452   7/1971   DeLaMare _____ 260—880

JOSEPH L. SCHOFER, Primary Examiner

W. F. HAMROCK, Assistant Examiner

U.S. Cl. X.R.

260—82.1, 879, 94.7 A

UNITED STATES PATENT OFFICE
CERTIFICATE OF CORRECTION

Patent No. 3,779,999           Dated December 18, 1973

Inventor(s) John L. Snyder, Mary J. Papavasiliou and Roger H. Mann

It is certified that error appears in the above-identified patent and that said Letters Patent are hereby corrected as shown below:

Column 8, line 7, before "ester" insert -- alcohol --.

Signed and sealed this 16th day of July 1974.

(SEAL)
Attest:

McCOY M. GIBSON, JR.
Attesting Officer

C. MARSHALL DANN
Commissioner of Patents